July 6, 1926.
MacDOUGALD DEXTER
1,591,293
OVEN ATTACHMENT
Filed Oct. 1, 1923
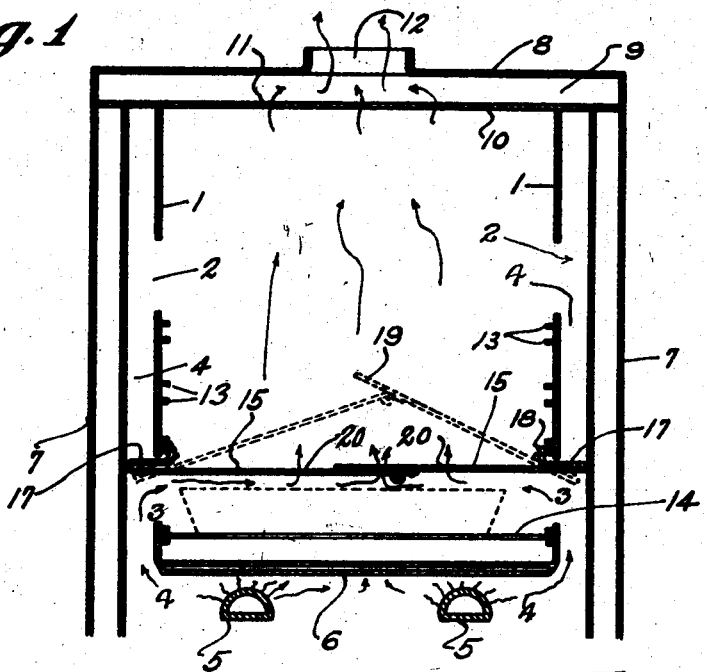
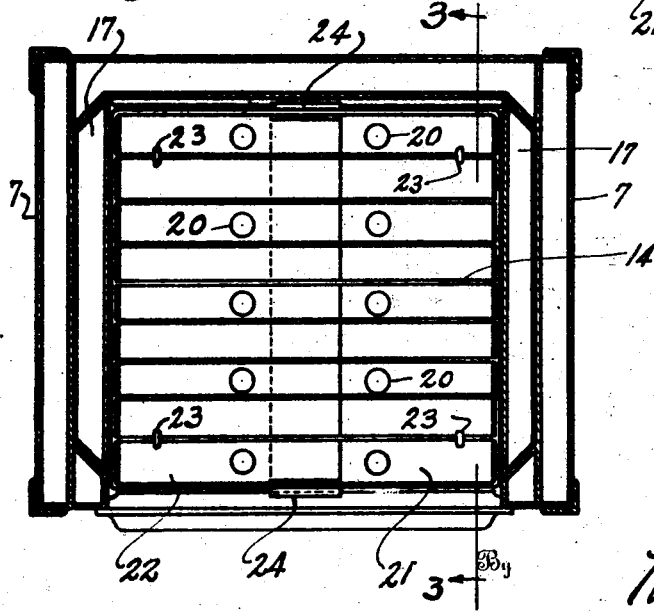
Inventor
MAC D. DEXTER.
Attorney Patented July 6, 1926.

1,591,293

UNITED STATES PATENT OFFICE.

MacDOUGALD DEXTER, OF COLUMBUS, GEORGIA.

OVEN ATTACHMENT.

Application filed October 1, 1923. Serial No. 665,930.

My invention relates to an oven attachment more particularly adapted for use in the ovens of gas and oil burning stoves, wherein the products of combustion are admitted, usually at different levels, into the oven and are taken out through one or more sets of ports at or near the top of the oven.

The object of my invention is to provide a heat intercepting baffle plate which can be readily inserted in and removed from the oven and which in position will intercept and direct all of the heat into the oven below it, thus concentrating the heat in an oven space of relatively small cubic contents as compared with the whole oven to the end that great economy in the consumption of fuel to heat the reduced oven space is obtained and a more rapid and efficient cooking action results from the bringing of the heat radiating surfaces forming the top and bottom of the oven space in close proximity both below and overhead to the article being cooked. Such a general object was contemplated in Letters Patent issued to myself and J. L. Duke, No. 1,082,414, but the construction therein shown required change or special design in the oven.

It is particularly an object of my present invention to design the heat intercepting baffle so that it may be used as an attachment with any standard make of oven and without modification or change in such oven.

My invention further comprises the novel details of construction and arrangement of parts, which in their preferred embodiments are illustrated in the accompanying drawings, which form a part of this specification, and in which:—

Fig. 1 is a vertical cross-sectional view through a typical gas stove oven, the full lines showing one type of my invention in operative position, and the dotted lines showing it in collapsed position preparatory to insertion.

Fig. 2 is a partial cross-sectional view of an oven with the modified type of baffle plate comprising laterally adjustable sliding sections suspended from a rack.

Fig. 3 is a horizontal sectional view of the rack and baffle taken on the line 3—3 of Fig. 2.

Similar reference numerals refer to similar parts throughout the drawings.

I have shown my invention in use with an oven of a gas burning stove which is conventionally illustrated and is typical of the oven of any gaseous or liqued fuel burning stove.

As shown, the oven comprises side walls 1 having upper and lower oppositely disposed pairs of transverse heat inlet ports 2 and 3. A vertical flue 4 is disposed on each side of the oven walls 1 and these flues receive the products of combustion from the burners 5, which products flow along and pass about each side of the oven bottom 6. The flues serve to conduct the heat to the ports 2 and 3, or only to the ports 3, as will be later described. The oven is enclosed in outer side walls 7 connected overhead to a top wall 8 which provides a flue space 9 between it and the top wall 10 of the oven proper. The products of combustion gain access to the oven through its ports 2 and 3 on each side, are carried off through top ports 11 into the space 9 and thence escape through the outlet flue 12. The oven walls 1 are provided with the customary rack guides 13 for the rack 14 which supports the cooking vessels. The oven as thus far described forms no particular part of my invention, being merely typical of any oven of this character.

In the embodiment of my invention illustrated in Fig. 1, the heat intercepting baffle plate is formed by two plates 15 having their inner edges overlapped and hinged and having their outer ends tapered at 17 so as to correspond substantially to the cross section of the heat flues 4. Each of the plates has hooklike members 18 at each side which are adapted to be engaged over the rack guides 13 immediately above the port 2 or 3. These members 18 may, if desired, be formed by bending back each tapered side edge 17 over upon itself and then upwardly and outwardly to form the rack guide engaging supports. It will be noted that one of the hinged sections is elongated to overlap the other to provide a stop extension 19 which will prevent the plate joint from breaking below a horizontal plane. In applying this form of my invention, the plate joint is broken upwardly, thus drawing the ends 17 and hook members 18 inwardly to a width which will permit the baffle plate being inserted into the oven and then its hook members 18 are caused to engage the desired guides 13 as the plate joint is forced downwardly so as to expand the tapered arm ends 17 of the plates until they pass through the openings 2 or 3 and engage the outer flue walls of the flues 4 and thus intercept the heat tending to rise in the flues at the plate level and divert it horizontally into the oven space below the plate. The baffle plate is provided with one or more suitably disposed holes 20 through which the heat escapes into the uppermost part of the oven and thence to the flue 12.

In Figs. 2 and 3 I illustrate a different embodiment of my invention. Here the baffle is formed by two plates 21 and 22 which are overlapped along the center of the oven from front to rear. Each plate is provided with a plurality of hooks or eyes 23 which are adapted to engage the transverse members of a rack 14 and one plate has its front and rear end edges 24 bent up and over the other plate so that the plate sections are interlocked and suspended from the rack free to slide laterally. The plates, when inserted with the rack, are drawn close enough together to permit their insertion through the oven door opening. The operator then slides the plate sections apart laterally until their tapered ends enter and close the flues 4. The holes 20 are provided in this plate as in the baffle plate first described and these furnish a ready means for grasping the plate sections to shift them laterally. The suspension hooks 23 may be separately formed and attached to the plates or they may be stamped up from the plates.

In operation, either type of plate desired is mounted in the manner described so as to intercept the heat rising in the flues 4 and divert it into the oven space below the plate, causing it to flow laterally until it can escape upwardly through the baffle plate holes 20, thus bringing the heat radiating surfaces to the top and bottom of the oven in the desired close relationship to the article to be cooked which is necessary for the economical use of fuel. While the effect of the baffle plate is of greater importance as used at the line of the lower pair of inlet ports 3, nevertheless it is efficient even if used at the upper ports 2 by reason of bringing the baffle forming the radiating top surface of the oven closer to the food to be cooked.

Though I have described with great particularity the details of the embodiment of the invention herein shown, it is not to be construed that I am limited thereto, as changes in arrangement and substitution of equivalents may be made by those skilled in the art without departing from the invention as defined in the appended claims.

Having thus described my invention, what I claim as new and desire to secure by Letters Patent, is:—

1. In combination with an oven having side heat flues and opposite inlet ports opening therefrom into the oven, of a baffle attachment having intermediate heat outlet openings and adapted to be inserted through the oven door opening and having extensible parts mounted thereon and disposed and adapted to project through said ports and intercept said flues, and means to mount said baffle near the upper level of opposite inlet ports.

2. In combination with an oven having side heat flues and opposite inlet ports opening therefrom into the oven, of a baffle attachment having intermediate heat outlet openings and adapted to be collapsed and inserted through the oven door opening and having extensible parts disposed and adapted, when the baffle is expanded, to project through said ports and intercept said flues, rack guides in the oven above each port, and means to suspend said baffle from said guides in position to intercept the heat rising through the side heat flues near the upper level of a pair of opposite ports and direct it into the oven below the baffle.

In testimony whereof I affix my signature.

MacDOUGALD DEXTER.